(12) United States Patent
Silvestri

(10) Patent No.: US 12,730,297 B2
(45) Date of Patent: Sep. 8, 2026

(54) SYSTEM AND METHOD FOR ADJUSTING THE ALIGNMENT OF A LIGHT SHEET MICROSCOPE

(71) Applicant: CONSIGLIO NAZIONALE DELLE RICERCHE, Rome (IT)

(72) Inventor: Ludovico Silvestri, Rome (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 0 days.

(21) Appl. No.: 19/114,696

(22) PCT Filed: Sep. 22, 2023

(86) PCT No.: PCT/EP2023/076173

§ 371 (c)(1),
(2) Date: Mar. 24, 2025

(87) PCT Pub. No.: WO2024/068447

PCT Pub. Date: Apr. 4, 2024

(65) Prior Publication Data

US 2026/0099038 A1 Apr. 9, 2026

(30) Foreign Application Priority Data

Sep. 26, 2022 (IT) ........................ 102022000019695

(51) Int. Cl.

*G02B 21/36* (2006.01)
*G02B 21/00* (2006.01)
*G02B 21/24* (2006.01)

(52) U.S. Cl.

CPC ....... *G02B 21/365* (2013.01); *G02B 21/0076* (2013.01); *G02B 21/244* (2013.01); *G02B 21/247* (2013.01)

(58) Field of Classification Search

None
See application file for complete search history.

(56) References Cited

U.S. PATENT DOCUMENTS 6,875,972 B2 4/2005 Kreh
2019/0219811 A1 7/2019 Keller et al.
(Continued)

FOREIGN PATENT DOCUMENTS

WO WO-2018122093 A1 * 7/2018 ............. G02B 7/343

OTHER PUBLICATIONS

Apr. 4, 2024—(WO) ISR and Written Opinion—App PCT/EP2023/076173.

(Continued)

*Primary Examiner* — Edemio Navas, Jr.
(74) *Attorney, Agent, or Firm* — Banner & Witcoff, Ltd.

(57) ABSTRACT

It is disclosed a system and method for adjusting the alignment of a light sheet microscope. A beam splitter intercepts a fraction of light emitted by a slice of a sample illuminated by the light sheet. The intercepted light fraction is focused to form two bidimensional images on a photo-detector, each bidimensional image being formed by rays coming from a respective portion of an exit pupil of the microscope's objective. At least two pairs of corresponding areas are identified in the two bidimensional images, and a mutual distance between corresponding areas of each pair is determined. A misalignment parameter indicative of a mis-alignment of the light sheet relative to a focal plane of the microscope's objective is then calculated, based on the determined mutual distances of the various pairs of corre-sponding areas. An adjustment command is then generated based on the misalignment parameter.

10 Claims, 7 Drawing Sheets

(56) References Cited

U.S. PATENT DOCUMENTS

2022/0187587 A1 6/2022 Baranson et al.
2025/0164768 A1* 5/2025 Sanchez ............... A61B 5/0077

OTHER PUBLICATIONS

L. Silvestri et al: "Confocal light sheet microscopy: micron-scale neuroanatomy of the entire mouse brain", Optics Express, vol. 20, issue 18, p. 20582, Aug. 2012.
Baumgart et al: "Scanned light sheet microscopy with confocal slit detection" Optics Express, vol. 20, 21805-21814 (2012).

* cited by examiner

SYSTEM AND METHOD FOR ADJUSTING THE ALIGNMENT OF A LIGHT SHEET MICROSCOPE

CROSS-REFERENCE TO RELATED APPLICATION(S)

This Application is the US national stage of PCT/EP2023/076173, filed Sep. 22, 2023, which claims priority to IT application No. 102022000019695, filed Sep. 26, 2022, the entire contents of which are incorporated herein by reference.

TECHNICAL FIELD

The present invention generally relates to the field of optical instruments. In particular, the present invention relates to a system and method for adjusting the alignment of a light sheet microscope, for example (but not exclusively) a light sheet fluorescence microscope (LSFM).

BACKGROUND ART

As known, a compound optical microscope comprises a tube lens and an objective. The objective usually comprises a first system of lenses placed in proximity of a sample to be analyzed, whereas the tube lens comprises a second system of lenses placed in proximity of the observation point. The objective collects the light emitted by the sample, and such emitted light is then focused by the tube lens onto the surface of a photodetector (usually a CCD) to create a magnified image of the sample.

Light sheet fluorescence microscopy (LSFM) is a technique for three-dimensional analysis of samples (typically, but not exclusively, biological samples), which exhibits both high resolution and high frame acquisition rates. In LSFM, a light sheet illuminates a thin slice (usually, a few hundred nanometers to a few micrometers) within the sample. The fluorescence light emitted by the illuminated slice of the sample is collected along an axis perpendicular to the light sheet by the objective of the microscope, and then it is focused onto the surface of the photodetector by the tube lens.

In LSFM, it is important that the light sheet is aligned with the focal plane of the microscope objective, namely that the light sheet lays on the focal plane of the microscope objective. Otherwise, the whole image (or some parts of the image) results blurred, thereby compromising resolution and contrast achieved by the microscope.

Misalignment between the light sheet and the focal plane of the objective can be of different types.

Specifically, a first type of misalignment consists in a global shift (also termed "defocus") of the light sheet relative to the focal plane. In this case, the light sheet is parallel to the focal plane, but it lays at a certain distance therefrom.

Other types of misalignments consist in rotations of the light sheet relative to the focal plane. Specifically, FIG. 1 schematically shows a light sheet 100 and three orthogonal axes x, y and z, where axis z coincides with the optical axis of the microscope while x and y are two orthogonal axes in the focal plane of the objective of the microscope. A rotation of the light sheet 100 relative to the focal plane with respect to the axis x as indicated by the arrow Ax is called "tip", whereas a rotation of the light sheet 100 relative to the focal plane with respect to the axis y as indicated by the arrow Ay is called "tilt".

The more each of the above types of misalignments (defocus, tip and tilt) is minimized, the better the performance of the microscope in terms of resolution and contrast.

US 2019/219811 A1 discloses a method for automated adjustment of light sheet geometry in a microscope, which provides for measuring one or more properties relating to the light-sheet imaging, analyze them and adjusting one or more operating parameters associated with the light-sheet imaging based on the analysis of the one or more measured properties.

SUMMARY OF THE INVENTION

The Applicant has noticed that the method for automated adjustment of light sheet geometry of US 2019/219811 A1 exhibits some drawbacks.

In particular, the method for US 2019/219811 A1 provides for a parameter optimization based on a merit figure linked to contrast of the collected images. Hence, it requires to stop operation of the microscope for a certain time, slowing down data acquisition, and is thus not suitable in cases where the microscope must operate continuously.

In view of the above, the Applicant has tackled the problem of providing a system and method for adjusting the alignment of a light sheet microscope (for example, but not exclusively, a light sheet fluorescence microscope) which overcomes the aforesaid drawbacks.

In particular, the Applicant has tackled the problem of providing a system and method for adjusting the alignment of a light sheet microscope (for example, but not exclusively, a light sheet fluorescence microscope) which allows performing a continuous adjustment of the alignment of the light sheet while the microscope is operating, namely while the microscope is acquiring images of the sample.

In the present description and in the claims, the expression "alignment of a light sheet microscope" is used to designate the alignment of the light sheet generated by the light source of the microscope with the focal plane of the objective of the microscope.

According to embodiments of the present invention, this problem is solved by a system comprising a beam splitter intercepting a fraction of the light emitted by the sample slice illuminated by the light sheet; an arrangement of optical elements and a photodetector, the arrangement of optical elements focusing the intercepted fraction of the light emitted by the sample slice to form two bidimensional images of the sample slice on the photodetector, each bidimensional image being formed by rays coming from a respective portion of an exit pupil of the objective; and a data processing unit which identifies at least two pairs of corresponding areas in the two bidimensional images, determines a mutual distance between the corresponding areas of each pair as a mutual rigid lateral displacement between such corresponding areas, calculates at least one misalignment parameter indicative of a misalignment of the light sheet relative to the focal plane of the objective of the microscope based on the mutual distance calculated for each pair of corresponding areas, and generates at least one alignment adjustment command based on the calculated misalignment parameter.

Such system advantageously allows measuring possible misalignments (and then adjusting the alignment) of the light sheet microscope substantially in real time, without stopping acquisition of images of the sample by the microscope.

A single exposure of the photodetector to the intercepted and focused fraction of the light emitted by the illuminated sample slice is indeed sufficient to form the two bidimensional images on the photodetector. Further, the processing of the two bidimensional images by the data processing unit to calculate the misalignment parameter(s) (and then the alignment adjustment command(s)) takes a very short time, comparable to the typical frame acquisition rate of a light sheet microscope.

The system therefore advantageously allows to perform a continuous adjustment of the alignment of the light sheet while the microscope is operating, thereby maximizing the quality of all the acquired images. This advantageously allows keeping the image quality high also when analyzing samples that introduce misalignment and low-level aberrations, as it typically occurs when the samples to be analyzed are not perfectly homogeneous.

Further, advantageously, there is no need to subject the microscope to manual periodic (weekly or daily) alignments, as it is required in most currently commercially available light sheet microscopes.

According to a first aspect, the present invention provides a system for adjusting alignment of a light sheet microscope comprising a light source configured to generate a light sheet illuminating a slice of a sample wherein the system comprises:

- a beam splitter configured to intercept a fraction of light emitted by the slice of the sample when illuminated by the light sheet;
- an arrangement of optical elements and a photodetector, the arrangement of optical elements being configured to focus the intercepted fraction of the light emitted by the slice of the sample to form two bidimensional images on the photodetector, each bidimensional image being formed by rays coming from a respective portion of an exit pupil of an objective of the light sheet microscope; and
- a data processing unit configured to identify at least two pairs of corresponding areas in the two bidimensional images, for each pair of corresponding areas determine a mutual distance as a mutual rigid lateral displacement between corresponding areas of the pair of corresponding areas, calculate at least one misalignment parameter indicative of a misalignment of the light sheet relative to a focal plane of the objective of the microscope based on the mutual distance determined for each pair of corresponding areas, and generate at least one alignment adjustment command based on the at least one misalignment parameter.

Preferably, the arrangement of optical elements comprises:

- at least one first optical element configured to form an image of the output pupil of the objective of the light sheet microscope; and
- at least one second optical element located substantially where the image of the output pupil is formed and configured to deflect at least part of light rays coming from the output pupil so that, downstream the image of the output pupil, the first light rays coming from the first portion of the output pupil and the second light rays coming from the second portion of the output pupil follow separate optical paths and converge in the respective two-dimensional images, the first portion and the second portion of the output pupil (P) being non overlapping.

Preferably, the data processing unit is configured to apply to each pair of corresponding areas an overall merit function providing a measure of the similarity between the corresponding areas of the pair and to determine the mutual distance as the mutual rigid lateral translation between the corresponding areas of the pair which maximizes the value of the overall merit function.

Preferably, the data processing unit is configured to determine a defocus of each area of the illuminated slice of the sample represented by a respective pair of corresponding areas in the two bidimensional images, based on the mutual distance calculated for the respective pair of corresponding areas.

Preferably, the at least one misalignment parameter comprises a defocus parameter indicative of a distance between the light sheet and the focal plane of the objective calculated as an average of the defocus calculated for the at least two pairs of corresponding areas.

Preferably, areas of the at least two pairs of corresponding areas identified in a same bidimensional image of the two bidimensional images are reciprocally non overlapping.

Preferably, areas of the at least two pairs of corresponding areas identified in the two bidimensional images are substantially rectangular.

Preferably, the data processing unit is configured to identify the at least two pairs of corresponding areas in the two bidimensional images by splitting each one of the two bidimensional images into four quadrants defined by two orthogonal axes and by identifying one pair of corresponding areas in each pair of corresponding quadrants of the two bidimensional images.

In this case, preferably, the at least one misalignment parameter comprises a rotation angle between the light sheet and the focal plane of the objective about one of the two orthogonal axes, the rotation angle being proportional to the difference between:

- the defocus calculated for at least one pair of corresponding areas identified in a pair of corresponding quadrants lying on a side of said one of the two orthogonal axes; and
- the defocus calculated for at least one further pair of corresponding areas identified in further pair of corresponding quadrants lying on a further side of the one of the two orthogonal axes.

According to a particularly preferred embodiment, the system is further suitable for adjusting the alignment of a light beam with a detection slit of the light sheet microscope, the light sheet being produced by applying to the light beam a translation over time along a direction perpendicular to the light beam, the system further comprising:

- an optical element configured to intercept a further fraction of light emitted by a strip of the slice of the sample when illuminated by the light beam; and
- a further arrangement of optical elements and a further photodetector, the further arrangement of optical elements being configured to apply to the further fraction of light a further translation equal and opposite to the translation applied to the light beam, and to focus the further fraction of light to form a unidimensional image on the further photodetector, wherein the data processing unit is further configured to determine a position of the unidimensional image on the further photodetector, calculate at least one further misalignment parameter indicative of a misalignment of the light beam relative to the detection slit based on the position of the unidimensional image on the further photodetector, and generate at least one further alignment adjustment command based on the at least one further misalignment parameter.

Preferably, the optical element comprises a beam splitter or dichroic mirror.

According to a second aspect, the present invention provides a method for adjusting alignment of a light sheet microscope comprising a light source configured to generate a light sheet illuminating a slice of a sample, wherein the method comprises:

a) intercepting a fraction of light emitted by the slice of the sample when illuminated by the light sheet;
b) focusing the intercepted fraction of the light emitted by the slice of the sample to form two bidimensional images on a photodetector, each bidimensional image being formed by rays coming from a respective portion of an exit pupil of an objective of the light sheet microscope; and
c) identifying at least two pairs of corresponding areas in the two bidimensional images;
d) for each pair of corresponding areas, determining a mutual distance as a mutual rigid lateral displacement between corresponding areas of the pair of corresponding areas;
e) calculating at least one misalignment parameter indicative of a misalignment of the light sheet relative to a focal plane of the objective of the microscope based on the mutual distance determined for each pair of corresponding areas; and
f) generating at least one alignment adjustment command based on the at least one misalignment parameter.

According to a third aspect, the present invention provides a system for adjusting the alignment of a light beam produced by the light source of a light sheet microscope with a detection slit of the light sheet microscope, a translation over time along a direction perpendicular to the light beam being applied to the light beam to produce a light sheet illuminating a slice of a sample, the system comprising:

an optical element configured to intercept a fraction of light emitted by a strip of the slice of the sample when illuminated by the light beam;

an arrangement of optical elements and a photodetector, the arrangement of optical elements being configured to apply to the fraction of light a further translation equal and opposite to the translation applied to the light beam, and to focus the fraction of light to form a unidimensional image on the photodetector; and a data processing unit configured to determine a position of the unidimensional image on the photodetector, calculate at least one misalignment parameter indicative of a misalignment of the light beam relative to the detection slit based on the position of the unidimensional image on the photodetector, and generate at least one alignment adjustment command based on the at least one misalignment parameter.

BRIEF DESCRIPTION OF THE DRAWINGS

The present invention will become clear from the following detailed description, given by way of example and not of limitation, to be read with reference to the accompanying drawings, wherein.

Annexed figures are not to scale.

DETAILED DESCRIPTION OF PREFERRED EMBODIMENTS OF THE INVENTION

Figure 2:
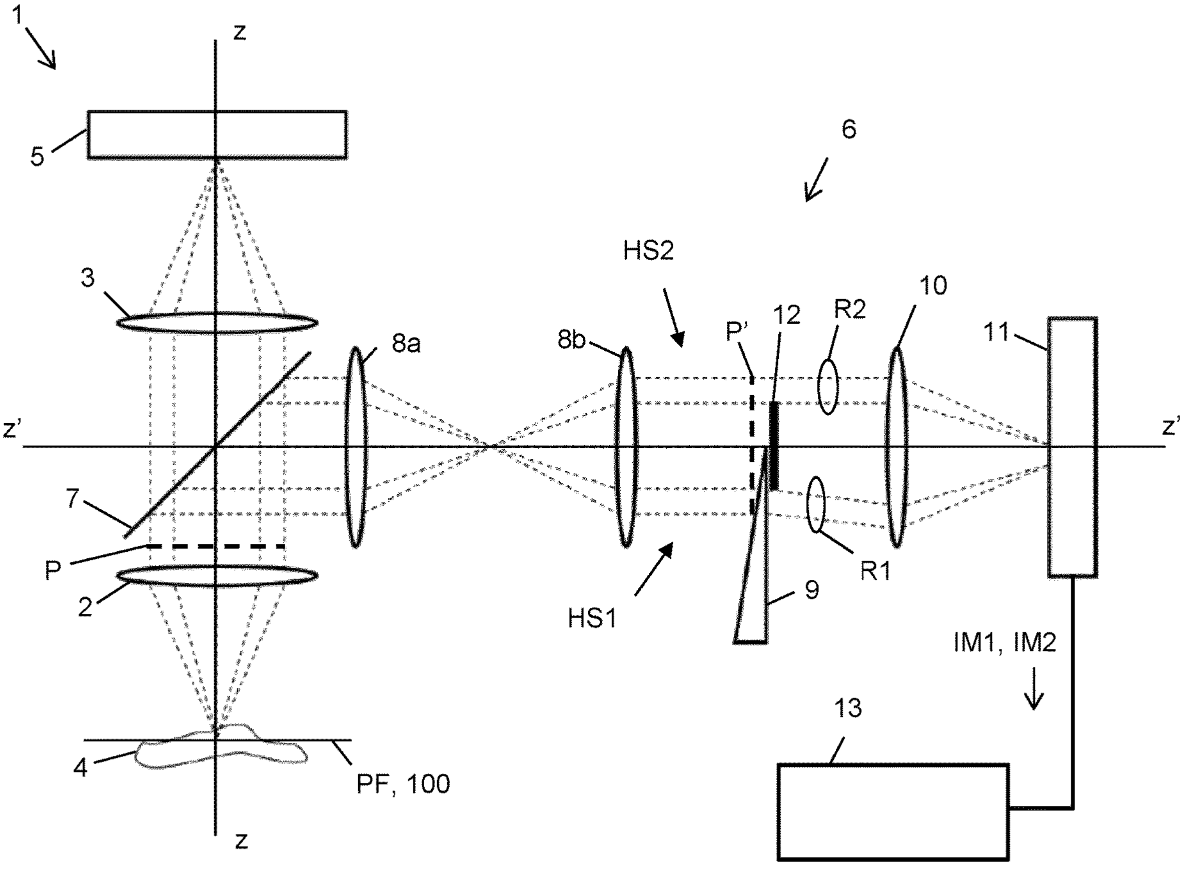
FIG. 2 schematically shows a system for adjusting the alignment of a light sheet microscope, according to a first embodiment of the present invention.

FIG. 2 shows a system for adjusting the alignment of a light sheet microscope, according to a first embodiment of the present invention.

The light sheet microscope 1 comprises an objective 2 and a tube lens 3 aligned along the axis z which, as described above with reference to FIG. 1, coincides with the optical axis of the microscope 1. The objective 2 and the tube lens 3 comprise respective systems of lenses (not shown in detail in FIG. 2), each of which may comprise one or more lenses aligned along the optical axis z.

The light sheet microscope 1 further preferably comprises a photodetector 5. The photodetector 5 may be for instance a bidimensional array of photodiodes, or a bidimensional CCD sensor, or a bidimensional CMOS sensor.

The light sheet microscope 1 further preferably comprises a light source (not depicted in FIG. 2) suitable for generating a light sheet which illuminates a thin slice (usually, a few hundred nanometers to a few micrometers) within a sample 4 to be analyzed. The light source may comprise a laser source and optical elements that shape the laser beam emitted by the laser source as a light sheet. Alternatively, as it will be described in further detail in connection with the second embodiment, the light sheet can be generated by translating along the axis y a laser beam (also termed "excitation beam") parallel to the axis x, thereby creating a light sheet parallel to the plane xy over time.

In the light sheet microscope 1, the light emitted by the slice of the sample 4 which is illuminated by the light sheet is collected by the objective 2 and focused by the tube lens 3, that in this way creates a magnified image of the illuminated slice of the sample 4. In particular, this magnified image is created by the tube lens 3 on the surface of the photodetector 5, which transforms the magnified image into a corresponding digital image. If the illuminated slice of the sample 4 is aligned with the focal plane PF of the objective 2 (namely, if the light sheet 100 lays on the focal plane PF of the objective 2), the magnified image and the corresponding digital image are in focus.

In order to guarantee the alignment of the light sheet 100 with the focal plane PF, the light sheet microscope 1 is equipped with a system 6 for adjusting the alignment of the microscope 1.

The system 6 comprises a beam splitter 7 configured to intercept a fraction of the light emitted by the illuminated slice of the sample 4.

The beam splitter 7 is preferably placed upstream of the objective 2, for example between the objective 2 and the tube lens 3, as schematically shown by way of example in FIG. 2. The beam splitter 7 is preferably oriented 45° apart from the optical axis z, in order to intercept the light coming from the objective 2 and deviate a fraction of said light along a second optical axis z'. The fraction of deviated light preferably amounts substantially to about 10% of the total light incident on the beam splitter 7. The optical axis z' preferably is substantially perpendicular to the optical axis z of the light sheet microscope 1.

The system 6 also preferably comprises an arrangement of optical elements, a photodetector 11 and a data processing unit 13.

The arrangement of optical elements is configured to focus the fraction of the light emitted by the illuminated slice of the sample 4 intercepted by the beam splitter 7 to form two bidimensional images of the sample slice on the photodetector 11, each bidimensional image being formed by rays coming from a respective portion of the exit pupil P of the objective 2.

Preferably, the arrangement of optical elements comprises:

- at least one first optical element configured to form an image P' of the exit pupil P of the objective 2 (the projection of which is schematically shown in FIG. 2); and
- at least one second optical element placed substantially where the exit pupil image P' is formed and configured to deviate at least part of the rays coming from the exit pupil P so that, downstream the exit pupil image P', rays R1, R2 coming from different, non-overlapping portions of the exit pupil P follow separate optical paths and are focused into respective bidimensional images IM1, IM2 of the sample slice on the photodetector 11.

More specifically, according to the first embodiment shown in FIG. 2, the arrangement of optical elements comprises one or more first lenses (two lenses, by way of non limiting example) 8*a*, 8*b*, a prism 9 and a second lens 10.

The two first lenses 8*a*, 8*b* are preferably plano-convex or bi-convex lenses, placed on the optical axis z'. According to a preferred embodiment, the lens 8*a* is placed at a distance from the exit pupil P of the objective 2 (the projection of which is schematically shown in FIG. 2) equal to its focal length fa, whereas the lens 8*b* is preferably placed at a distance from the lens 8*a* equal to the sum of their focal lengths fa+fb. In this way, the two first lenses 8*a*, 8*b* form the exit pupil image P' at a distance from the lens 8*b* equal to its focal length fb.

The prism 9 is preferably placed downstream the two first lenses 8*a*, 8*b*, substantially in the plane where the exit pupil image P' is formed, i.e. substantially at a distance fb from the lens 8*b*. The prism 9 is preferably configured to deviate the rays R1 coming from a first portion of the exit pupil P (and therefore of its image P') and to leave instead unhindered the rays R2 coming from a second portion of the exit pupil P (and therefore of its image P') spatially non-overlapping with the first portion of the exit pupil P.

For example, a plane containing the axis z' divides the space where the exit pupil image P' is located into two half-spaces HS1, HS2. The prism 9 may be configured to deviate the rays R1 coming from a first portion of the exit pupil P whose image P' is located in the half-space HS1 and to leave instead unhindered the rays R2 coming from a second portion of the exit pupil P whose image P' is located in the other half-space HS2. For example, as shown in FIG. 2, the prism 9 may be entirely placed in the half-space HS1.

Optionally, the system 6 may be provided also with a mask 12. Also the mask 12 is preferably placed substantially in the plane where the the exit pupil image P' is formed. In particular, the mask 12 may be placed immediately after the prism 9 (as schematically shown in FIG. 2) or immediately before the prism 9. The mask 12 is preferably shaped to define the two non-overlapping portions of the exit pupil P, from which the rays R1 deviated by prism 9 and the rays R2 not deviated by prism 9 come. For example, in the configuration shown in FIG. 2, the mask 12 may be a diaphragm with two apertures, one located in the half-space HS1 and the other located in the other half-space HS2. Each aperture may have, for example, the shape of a circular segment.

The area of each aperture of the mask 12 is preferably equal at least to the 5% of the area of the exit pupil P (and of the exit pupil image P'), more preferably is equal at least to the 10%, even more preferably is equal at least to the 20%. In this way, the system 6 is advantageously capable of averaging over a significant portion of the higher-order aberrations. This allows obtaining a measurement of the misalignment more robust against these higher-order aberrations, as will be discussed in more detail herein after.

As mentioned above, the mask 12 is optional. In absence of the mask, the two portions of the exit pupil P considered by the system 6 correspond to the two halves of the whole exit pupil P and of its image P', i.e. the half of the exit pupil image P' located in the half-space HS1, and the half of the exit pupil image P' located in the other half-space HS2.

The second lens 10 is preferably placed downstream the prism 9 (and the mask 12, if present), along the optical axis z'. The lens 10 is for example a plano-convex or bi-convex lens. It is preferably placed at a distance from the plane where the lenses 8*a* and 8*b* form the exit pupil image P' equal to its focal length $f_{10}$.

The photodetector 11 is placed downstream the second lens 10, preferably at a distance equal to the focal length $f_{10}$ of the lens 10. The photodetector 11 preferably comprises a bidimensional matrix of photodiodes, or a bidimensional CCD sensor, or a bidimensional CMOS sensor.

The second lens 10 preferably receives both the deviated rays R1 coming from the first portion of the pupil P through the prism 9, and the not deviated rays R2 coming from the second portion of the pupil P. The rays R1 are focused by the lens 10 onto the surface of the photodetector 11 to form a first image IM1 of the illuminated slice of the sample 4, whereas the rays R2 are focused by the lens 10 onto the surface of the photodetector 11 to form a second image IM2 of the illuminated slice of the sample 4.

The photodetector 11 preferably converts the bidimensional images IM1 and IM2 in digital format and sends them to the data processing unit 13.

Figure 3:
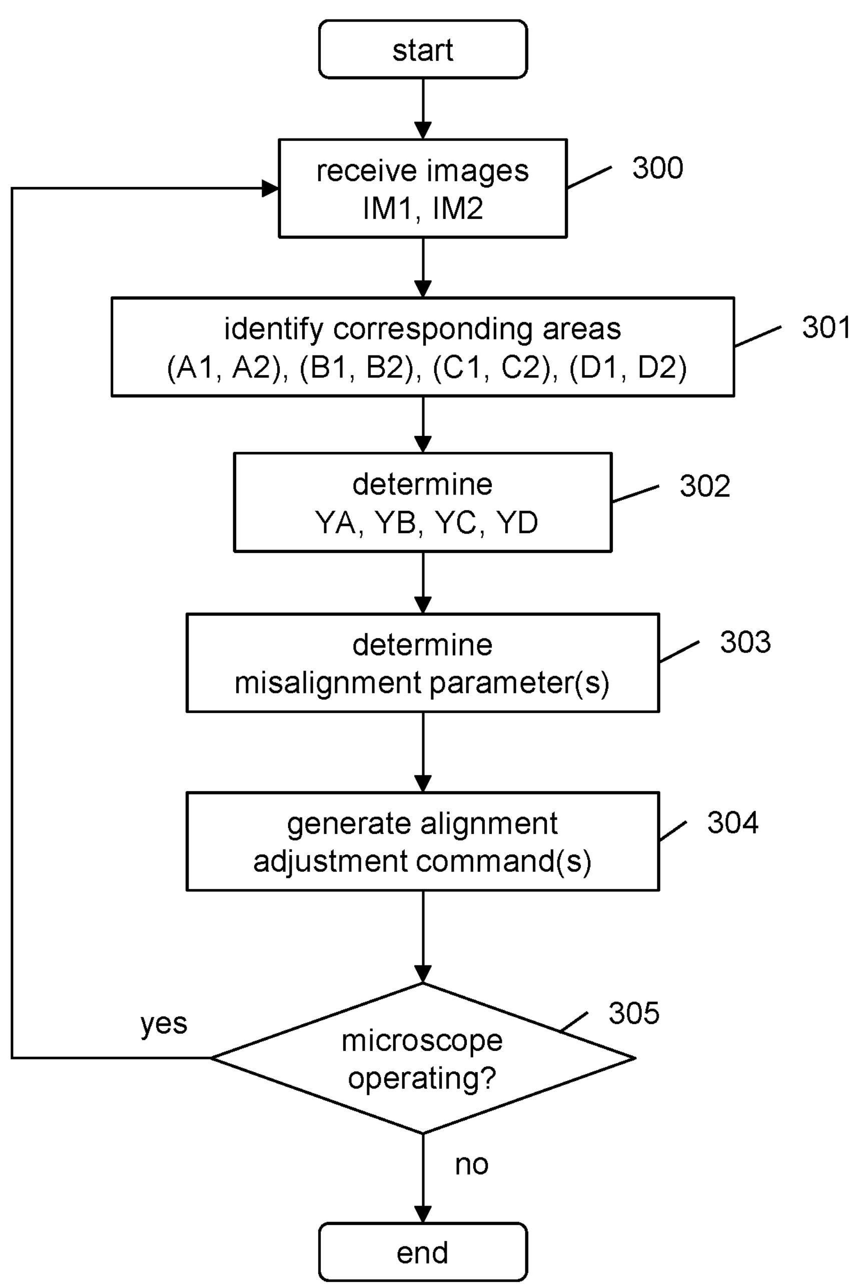
FIG. 3 is a flow chart of the operation of the data processing unit of the system of FIG. 2, according to a first embodiment of the present invention.

The operation of the data processing unit 13 will be now described in detail, with reference to the flow chart of FIG. 3.

As the data processing unit 13 receives the bidimensional images IM1, IM2 in digital format from the photodetector 11 (step 300), it preferably identifies at least two pairs of corresponding areas in the two bidimensional images IM1, IM2 (step 301). Within each image IM1, IM2, areas belonging to different pairs are preferably reciprocally non overlapping. As "corresponding areas" it is meant areas having substantially the same position relative to the respective image IM1, IM2, for example relative to a reference point (e.g. the leftmost upper corner of each image IM1, IM2). The areas are preferably rectangular. In this case, "corresponding areas" means two rectangles whose vertexes have the same coordinates within the respective image IM1, IM2.

Figures 4A, 4B:
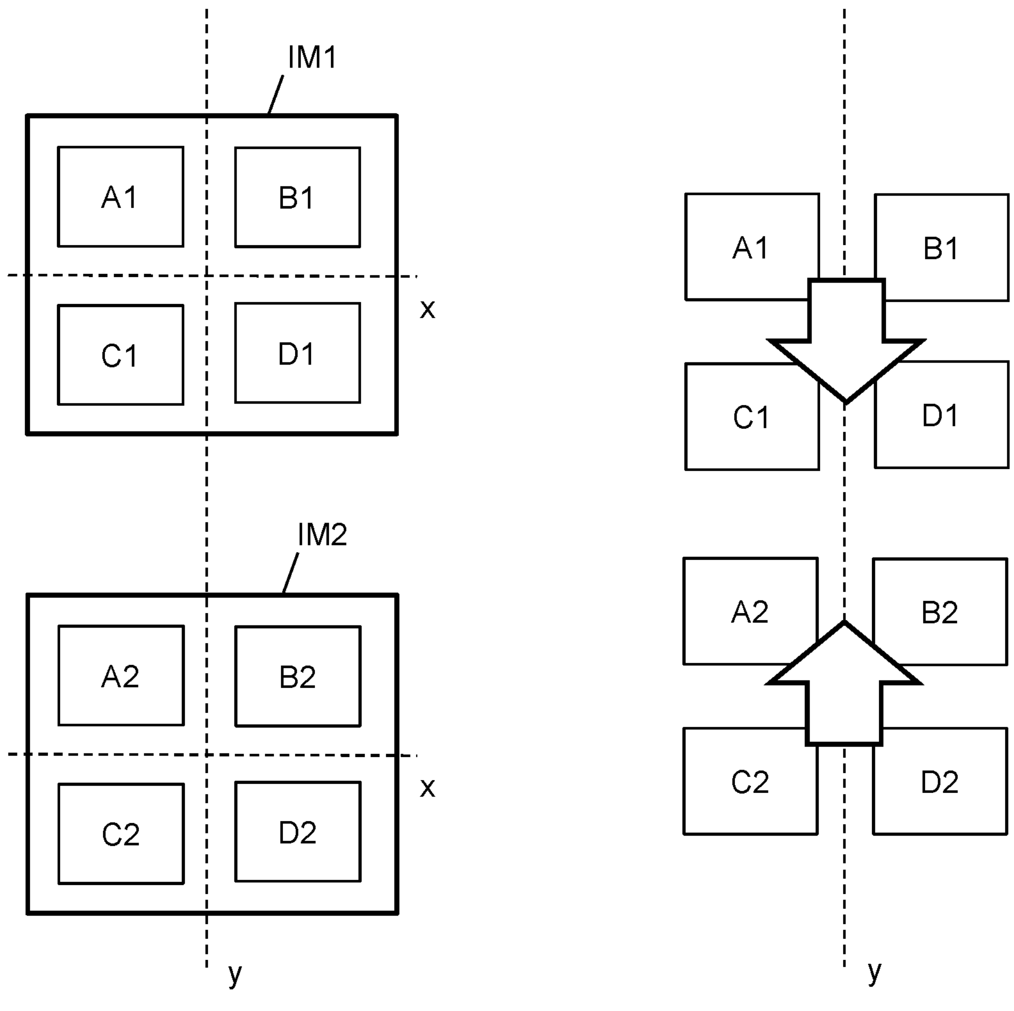
FIGS. 4*a*-4*d* show the mutual distances of corresponding areas in two images formed by the system of FIG. 2 in four exemplary scenarios.

In order to identify the corresponding areas, as schematically depicted in FIG. 4*a*, at step 301 the data processing unit 13 may split each image IM1, IM2 into four quadrants defined by two orthogonal axes. The quadrants may be for example those defined by the axis x and y corresponding to those depicted in FIG. 1. Then, the data processing unit 13 preferably identifies in the images IM1, IM2 one pair of corresponding areas (A1, A2), (B1, B2), (C1, C2) and (D1, D2) for each quadrant. In the image IM1 the areas A1, B1, C1 and D1 are reciprocally non overlapping and similarly, in the image IM2 the areas A2, B2, C2 and D2 are reciprocally non overlapping.

Each area A1, B1, C1, D1 in the first image IM1 formed by the rays R1 and the corresponding area A2, B2, C2, D2 in the second image IM2 formed by the rays R2 on the surface of the photodetector 11 are placed at a mutual distance YA, YB, YC, YD. Such distances depend on the alignment of the light sheet 100 with the focal plane PF of the objective 2.

Specifically, when the light sheet microscope 1 is aligned (i.e. the light sheet 100 exhibits no defocus, no tip and no tilt relative to the focal plane PF of the objective 2), the mutual distances YA, YB, YC, YD are all equal to a certain value Y0. This situation is schematically depicted in FIG. 4*a*.

Assuming instead that the light sheet 100 is subjected to a defocus relative to the focal plane PF (namely to a displacement along the optical axis z of the light sheet microscope 1, which preserves parallelism between the light sheet 100 and the focal plane PF), all the mutual distances YA, YB, YC, YD change from Y0 to a same value Y. In particular, as disclosed in WO 2018/122093, the value Y changes with the defocus according to the following equation:

$$Y(\Delta z) = Y0 - 2 \cdot G \cdot NA \cdot Mr \cdot \Delta z \quad [1]$$

where G is a geometric factor with value between 0 and 1 that takes into account the shape of the two portions of the pupil used to generate the images IM1 and IM2, NA is the numerical aperture of the objective 2 and Mr is the effective magnification of the images on the surface of the photodetector 11. The term Δz is the defocus, i.e. the distance between light sheet 100 and focal plane PF along the optical axis z. The defocus Δz is positive when the light sheet 100 is further away from the objective 2 than the focal plane PF, whereas defocus Δz is negative when the light sheet 100 is closer to the objective 2 than the focal plane PF. The value of Y is then lower than Y0 in case of positive defocus, while it is higher than Y0 in case of negative defocus. FIG. 4*b* schematically shows an exemplary case of positive defocus, where the mutual distances YA, YB, YC, YD are all equal to Y<Y0, as apparent from a comparison with FIG. 4*a*.

Figure 1:
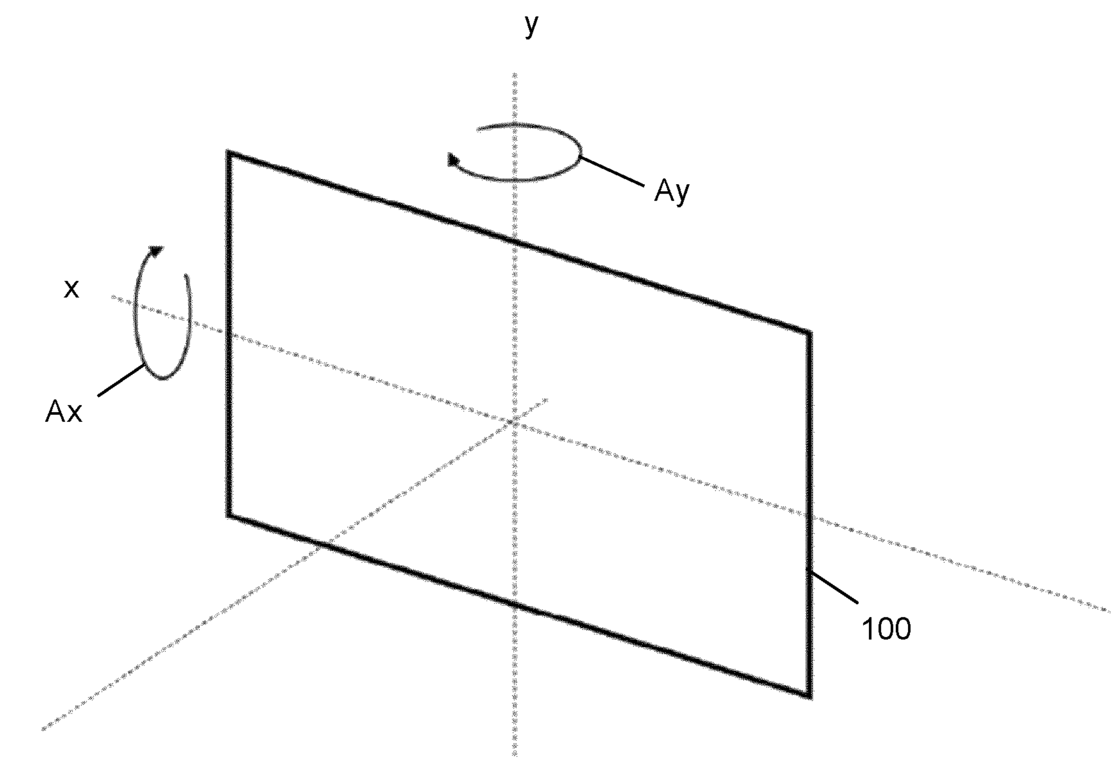
FIG. 1 (already described above) shows two types of misalignments between the light sheet of a light sheet microscope and the focal plane of its objective.
Figures 4C, 4D:
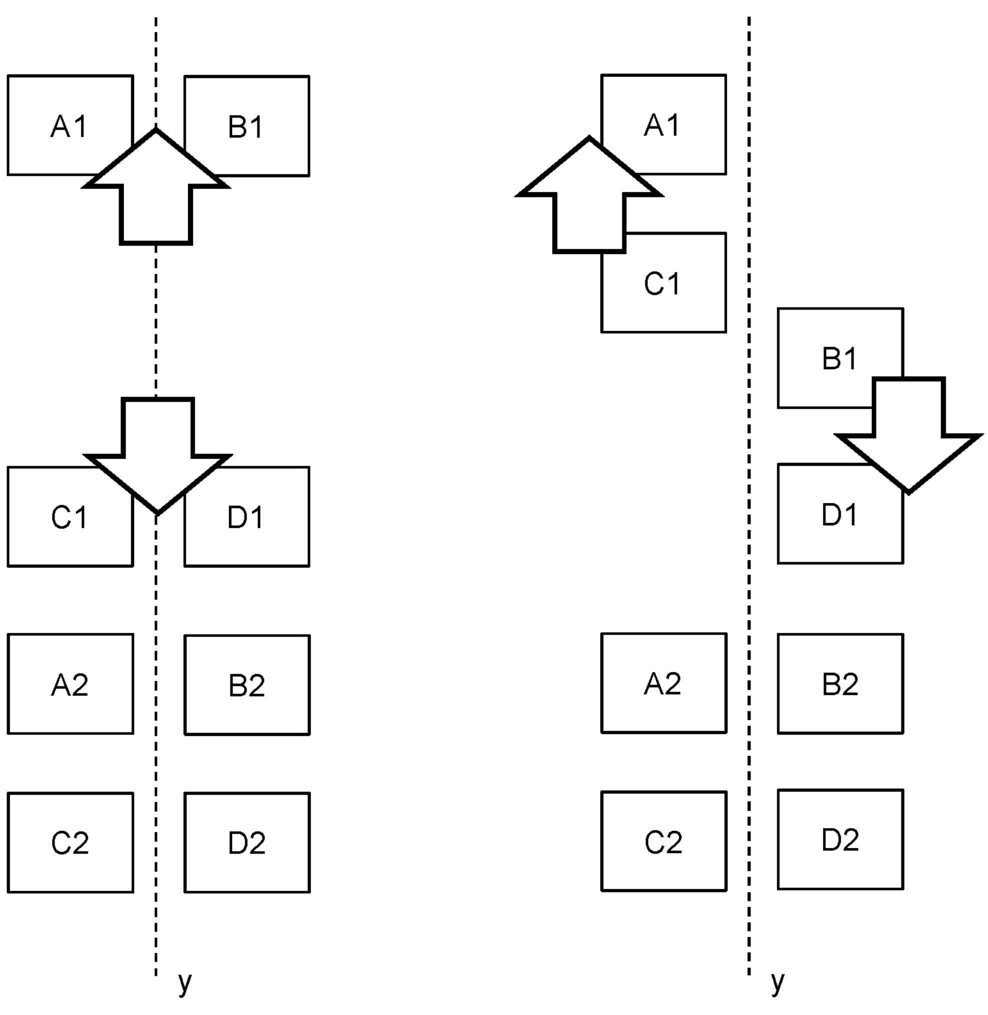

Assuming now that the light sheet 100 is subjected to a tip relative to the focal plane PF (namely to a rotation about the axis x, as indicated by the arrow Ax in FIG. 1), the mutual distances YA, YB will assume a same value Y and the mutual distances YC, YD will assume a same value Y' different from Y. Specifically, depending on the direction of the tip rotation, Y is higher than Y0 and Y' is lower than Y0, or vice versa. FIG. 4*c* schematically shows an exemplary case of tip, where the mutual distances YA, YB are equal to Y>Y0 and the mutual distances YC, YD are equal to Y'<Y0.

Assuming now that the light sheet 100 is subjected to a tilt relative to the focal plane PF (namely to a rotation about the axis y, as indicated by the arrow Ay in FIG. 1), the mutual distances YA, YC will assume a same value Y and the mutual distances YB, YD will assume a same value Y' different from Y. Specifically, depending on the direction of the tilt rotation, Y is higher than Y0 and Y' is lower than Y0, or vice versa. FIG. 4*d* schematically shows an exemplary case of tilt, where the mutual distances YA, YC are equal to Y>Y0 and the mutual distances YB, YD are equal to Y'<Y0.

By reverting to FIG. 3, the data processing unit 13 then preferably determines the mutual distances YA, YB, YC, YD between the corresponding areas (A1, A2), (B1, B2), (C1, C2) and (D1, D2) in the two bidimensional images IM1, IM2 (step 302).

Before determining the mutual distances YA, YB, YC, YD (or even before identifying the pairs of corresponding areas), the data processing unit 13 may optionally execute a pre-processing of the images IM1 and IM2 (step not shown in the flow chart of FIG. 3).

In this pre-processing phase, the data processing unit 13 preferably processes the images IM1 and IM2 in order to increase their contrast. To this aim, the data processing unit 13 may for example identify in the images IM1 and IM2 the pixels with a luminosity higher than a predefined threshold (expressed for example in relation to a percentile of the histogram of the luminosity values of the pixels in the image) and put to zero the value of those pixels whose luminosity is lower than the predefined threshold. Alternatively, the data processing unit 13 may use known methods of edge contrast enhancement based on the convolution with Gaussian kernels of different sizes.

Once the optional pre-processing phase is finished, the data processing unit 13 proceeds to the determination of the mutual distances YA, YB, YC, YD.

Preferably, to this aim the data processing unit 13 executes on each pair of corresponding areas (A1, A2), (B1, B2), (C1, C2) and (D1, D2) an algorithm of mutual rigid lateral displacement of bidimensional images.

In detail, with reference for example to the pair of corresponding areas (A1, A2), such algorithm applies to the areas A1 and A2 a global merit function, providing a measurement of their similarity, and determines the mutual distance δA between the areas A1 and A2 as the mutual lateral rigid displacement (along direction y) between the areas A1 and A2 maximizing the value of the global merit function.

For example, the global merit function may be a bidimensional cross-correlation between the areas A1 and A2. In this case, the data processing unit 13 preferably computes the normalized cross-correlation between the areas A1 and A2 according to the following equation:

$$CCN(y') = \frac{1}{N}\sum_{x,y}\frac{(A1(x, y) - A1_{av})\cdot(A2(x, y + y') - A2_{av})}{SDA1 \cdot SDA2} \quad [2]$$

where y' is the mutual rigid lateral displacement between the areas A1 and A2, N is the total number of pixels in each area A1 and A2, A1(*x,y*) is the value of pixel (x,y) in the area A1, A2(*x,y*) is the value of the pixel (x,y) in the area A2, A1*av* is the average value of all pixels in the area A1, A2*av* is the average value of all pixels in the area A2, SDA1 is the standard deviation of the pixels in the area A1 and SDA2 is the standard deviation of the pixels in the area A2.

The data processing unit 13 preferably computes the value of CCN for different values of the mutual rigid lateral displacement y' between the areas A1 and A2, and determines YA as the mutual rigid lateral displacement y' that provides the maximum value of CCN.

Alternatively, the global merit function may be a mutual information function between the images IM1 and IM2, defined as:

$$MI(y') = \sum_{a,b} p(a, b)\cdot\log\frac{p(a, b)}{p(a)\cdot p(b)} \quad [3]$$

where p(a,b) is the probability of having the value a in a generic pixel (x,y) in the area A1 and the value b in the corresponding pixel (x,y+y') in the area A2, p(a) is the probability of having the value a for a generic pixel in the area A1 and p(b) is the probability of having the value b for a generic pixel in the area A2. In practice, the mutual information function MI(y') provides a measurement of how much it is possible to predict the content of the area A2 knowing the content of the area A1, or vice versa. The probabilities p(a,b), p(a) and p(b) are obtained from the pixels histograms.

As in the previous example relative to cross-correlation, also in this case the data processing unit 13 preferably computes the value of the function MI(y') for different values of the mutual rigid lateral displacement y' between the areas A1 and A2, and determines YA as the mutual rigid lateral displacement y' that gives the maximum value of MI(y').

According to particularly advantageous variants, the data processing unit 13 may compute two or more values of YA using different global merit functions (eventually in combination with different methods for image pre-processing), and then combine the obtained values of YA. The obtained values of YA may be combined for example by computing an average (arithmetic, geometric or harmonic). Optionally, the mean may be a weighted mean. In this case, a weight for each value of YA may be a measurement of the quality of the alignment of the two areas A1 and A2 obtained from the merit function used to find that value of YA. For instance, the weight for each value of YA may be the maximum obtained value of the merit function, or the inverse of the mutual rigid lateral displacement with respect to YA for which the merit function is halved.

At step 302, the values of YB, YC and YD are determined by applying algorithms similar to those disclosed above in connection with the determination of YA.

Once the mutual distances YA, YB, YC, YD have all been determined, the data processing unit 13 preferably calculates at least one misalignment parameter indicative of a misalignment of the light sheet 100 relative to the focal plane PF of the objective 2, based on the mutual distances YA, YB, YC, YD (step 303).

To this purpose, a calibration phase of the light sheet microscope 1 is executed before the microscope 1 is used, wherein mutual distance values Y1, Y2, . . . . Yn are measured between two calibration images IM1*c*, IM2*c* of an illuminated slice of a calibration sample for different positive and negative defocus values Δz1, Δz2, . . . Δzn of the light sheet 100, including the null defocus Δz=0. This calibration phase thus provides a mapping (that, for example, the data processing unit 13 may store as a table) of the defocus values Δz1, Δz2, . . . Δzn of the light sheet 100 into respective mutual distance values Y1, Y2, . . . . Yn. This advantageously allows the data processing unit 13 to establish the value of Y0 and of the proportionality constant (2·G·NA·Mr) between the difference (Y−Y0) and the defocus Δz as per equation [1] above.

Therefore, when the calibrated light sheet microscope 1 is in use, at step 303 the data processing unit 13 may determine a defocus δA, δB, δC, δD of each area of the illuminated slice of the sample 4 (and hence of each area of the light sheet 100) represented by a respective pair of corresponding areas (A1, A2), (B1, B2), (C1, C2) and (D1, D2) in the images IM1, IM2. Each defocus 8A, 8B, 80, 8D may be determined based on the above mapping between defocus values Δz1, Δz2, . . . Δzn and respective mutual distance values Y1, Y2, . . . . Yn. Specifically, the defocus δA may be determined as the defocus value Azj (with j=1, 2 . . . n) mapped into the mutual distance value Yj (with j=1, 2 . . . n) which is closer to the mutual distance YA determined at step 302. The same applies also to the determination of 8B, 8C, 8D based on YB, YC, YD, respectively.

The data processing unit 13 may then combine the defocus values δA, δB, δC, δD into one or more misalignment parameters indicative of a misalignment of the light sheet 100 relative to the focal plane PF of the objective 2. Such one or more misalignment parameters preferably comprise one or more of: a defocus parameter indicative of a defocus of the light sheet 100 relative to the focal plane PF of the objective 2, a tip parameter indicative of a tip of the light sheet 100 relative to the focal plane PF of the objective 2, and a tilt parameter indicative of a tilt of the light sheet 100 relative to the focal plane PF of the objective 2.

The defocus parameter is preferably calculated as an average of the defocus values δA, δB, δC, δD of the different areas of the illuminated slice of the sample 4, namely:

$$\Delta z = \frac{\delta A + \delta B + \delta C + \delta D}{4} \qquad [4]$$

The tip parameter is preferably the rotation angle $\theta_{tip}$ of the light sheet 100 relative to the focal plane PF about the axis x. The rotation angle $\theta_{tip}$ is preferably proportional to the difference between the defocus calculated for the areas on one side of the axis x, and the defocus calculated for the areas on the other side of the axis x. Preferably, it is calculated according to the following equation:

$$\theta_{tip} = \frac{(\delta A + \delta C) - (\delta B + \delta D)}{X_{AB}} \qquad [5]$$

where $X_{AB}$ is the distance between the areas A1 and B1 (or A2 and B2) along the axis x perpendicular to the axis y along which the mutual displacements YA, YB, YC, YD are measured.

The tilt parameter is preferably the rotation angle $\theta_{tilt}$ of the light sheet 100 relative to the focal plane PF about the axis y. The rotation angle $\theta_{tilt}$ is preferably proportional to the difference between the defocus calculated for the areas on one side of the axis y, and the defocus calculated for the areas on the other side of the axis y. Preferably, it is calculated according to the following equation:

$$\theta_{tilt} = \frac{(\delta A + \delta B) - (\delta C + \delta D)}{Y_{AC}} \qquad [6]$$

where $Y_{AC}$ is the distance between the areas A1 and C1 (or A2 and C2) along the axis y along which the mutual displacements YA, YB, YC, YD are measured.

The data processing unit 13 then generates at least one alignment adjustment command based on the calculated misalignment parameter(s) (step 304).

For example, the alignment adjustment commands may comprise one or more commands to actuate one or more motorized mirrors (e.g. galvo mirrors and/or piezoelectric mirrors), which may be moved to adjust the position along the optical axis z and the rotation angles about the axis x and y of the plane where the light sheet 100 is formed.

The above steps may be repeated cyclically as long as the light sheet microscope 1 is operating (step 305). This guarantees the alignment of the light sheet microscope 1 during the whole operating cycle. The repetition rate may range from 1 Hz to 100 Hz (typically, 10 Hz), depending on the acquisition rate of the photodetector 11 and the processing time by the data processing unit 13.

The system 6 advantageously allows measuring possible misalignments (and then adjusting the alignment) of the light sheet microscope 1 substantially in real time, without stopping acquisition of images of the sample 4 by the microscope 1.

A single exposure of the photodetector 11 to the intercepted and focused fraction of the light emitted by the illuminated slice of the sample 4 is indeed sufficient to form the two bidimensional images IM1, IM2 on the photodetector 11. Further, the processing of the two bidimensional images IM1, IM2 by the data processing unit to calculate the misalignment parameter(s) (and then the alignment adjustment command(s)) takes a very short time, comparable to the typical frame acquisition rate of a light sheet microscope.

Furthermore, since the system is based on the measurement of the mutual distances YA, YB, YC, YD between corresponding areas of the images IM1, IM2 in terms of mutual rigid lateral displacement of corresponding areas of the two bidimensional images formed by the rays R1 and R2 coming from two different non-overlapping portions of the exit pupil P, it advantageously provides a measurement of the average defocus of all the field of view of the light sheet microscope 1.

The global nature of the measurement of the mutual distances YA, YB, YC, YD makes it advantageously robust against possible aberrations introduced by the sample 4.

Furthermore, the global nature of the measurement of the mutual distances YA, YB, YC, YD makes the system 6 applicable in conditions of low signal to noise ratio. This happens because the signals provided by the photodetector 11—i.e. the information content of the images IM1 and IM2—are used in their entirety. The signal to noise ratio is thus intrinsically better with respect to other known systems, which use only a part of the information content of the obtained images.

Furthermore, the global nature of the measurement of the mutual distances YA, YB, YC, YD makes the system 6 advantageously applicable also in the case of sparse samples. Indeed, since significantly large portions of the field of view of the microscope 1 are used, the chance of having no distinctive and recognizable feature of the sample 4 in the images IM1 and IM2 is advantageously minimized, also in the case when the sample 4 is sparse.

Furthermore, the system 6 is advantageously flexible, in the sense that it may operate in a wide range of numerical apertures and with portions of the pupil P of different dimensions, differently from what happens with known systems using punctual measurements. For example, the two portions of the pupil P used to generate the images IM1 and IM2 may be chosen replacing the mask 12. This advantageously allows to find the best tradeoff between larger portions of the pupil (allowing gathering more light and thus having, for example, a measurement of the mutual distances YA, YB, YC, YD more robust with respect to spherical aberrations) and smaller portions of the pupil (providing longer depth of field and thus a more accurate measurement of the mutual distances YA, YB, YC, YD).

Finally, the system 6 may be implemented with ordinary optical components, and may be used also in situations where it is necessary to use a specific sensor for image acquisition, e.g. an intensified or electro-multiplied camera.

Although the system 6 described above comprises a prism 9, this shall not be considered as limiting the scope of the present invention. Instead of the prism 9, according to other variants other optical elements or arrangements of optical elements may be used to carry out the same function of deviating the rays R1, such as one or more mirrors.

Further, although in the system 6 described above the two images IM1, IM2 are both generated on the surface of the same photodetector 11, this is also not limiting. According to other embodiments, the rays R1 and the rays R2 may be focused on separate photodetectors, so that the images IM1, IM2 are generated on the surfaces of different photodetectors. In this case, the data processing unit 13 preferably determines the mutual distances YA, YB, YC, YD with reference to respective points (for example, a vertex) identified on the surface of each photodetector.

Although the system 6 described above is placed between the objective 2 and the tube lens 3 of the microscope 1, this is not restrictive. The system 6 could be indeed placed at any point upstream the exit pupil P of the objective 2, for example between the photodetector 5 and the tube lens 3 of the microscope 1.

Figure 5:
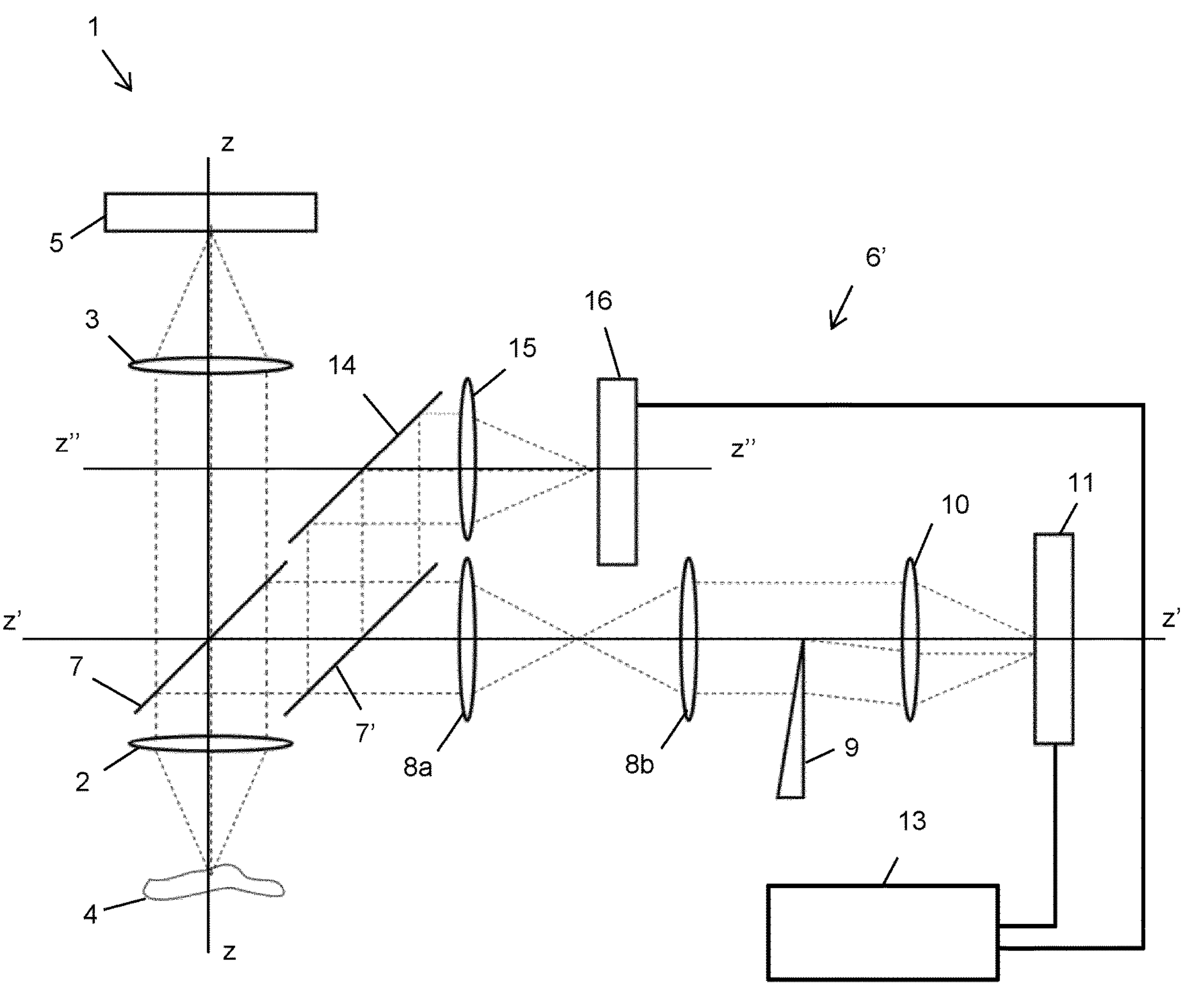
FIG. 5 schematically shows a system for adjusting the alignment of a light sheet microscope, according to a second embodiment of the present invention.

FIG. 5 shows a system for adjusting the alignment of a light sheet microscope, according to a second embodiment of the present invention.

This second embodiment is particularly advantageous when the light sheet microscope 1 uses confocal detection.

For example, L. Silvestri et al: "Confocal light sheet microscopy: micron-scale neuroanatomy of the entire mouse brain", Optics Express, vol. 20, issue 18, p. 20582, August 2012 discloses a confocal light sheet microscope wherein a light beam parallel to the axis x (also termed herein below "excitation beam") is scanned, namely it is translated over time along the axis y orthogonal to the axis x, thereby creating a light sheet parallel to the plane xy over time. As the excitation beam is scanned, the fluorescence light emitted by the strip of the sample illuminated by the excitation beam is collected by the objective and focused by the tube lens in a spatial filter (namely, a wall with a slit parallel to the axis x) positioned between tube lens and photodetector. Since the spatial filter is in a fixed position while the excitation beam (and hence also the light emitted by the strip of the sample illuminated by the excitation beam) continuously changes position along the axis y due to the scanning, the light emitted by the illuminated strip is descanned before it reaches the spatial filter, namely it is subjected to a translation over time along the axis y equal and opposite to the scanning, namely to the translation applied to the excitation beam. Scanning and descanning are performed by two synchronized arrangements of galvo mirrors, the scanning arrangement being placed upstream the sample and the descanning arrangement being placed between sample and spatial filter.

Instead of the fixed-position spatial filter preceded by descanning, Baumgart et al: "Scanned light sheet microscopy with confocal slit detection" Optics Express, vol. 20, 21805-21814 (2012) discloses a confocal light sheet microscope wherein a single line of pixels on the photodetector is active, the active line of pixels being translated along the axis y over time, synchronously with the scanning of the excitation beam, so as to implement a "rolling shutter".

In confocal light sheet microscopes, whether a fixed-position spatial filter or a rolling shutter is used to perform confocal detection, in any case it is important that the excitation beam is aligned with the detection slit of the microscope during the whole scanning cycle, where the expression "excitation beam (or light beam) aligned with the detection slit" will be used in the present description and in the claims to indicate a situation where the light emitted by the sample strip illuminated by the excitation beam (after descanning, if a fixed-position spatial filter is used) is aligned with either the slit of the spatial filter or the line of active pixels of the rolling shutter, during the whole scanning cycle of the excitation beam.

Figures 6A, 6B, 6C:
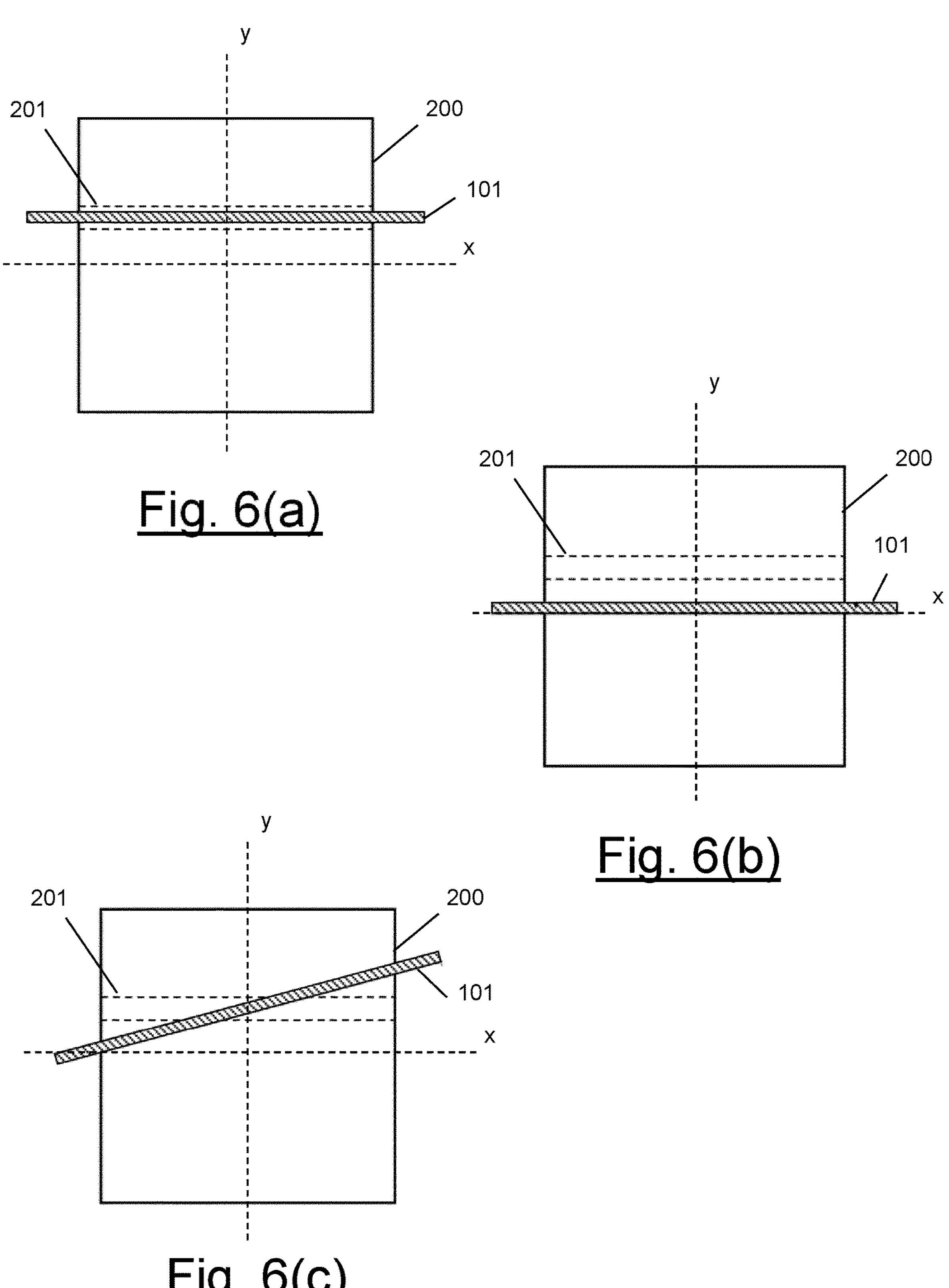
FIGS. 6(*a*)-6(*c*) show possible misalignments of the excitation beam forming a light sheet in a light sheet microscope with the spatial filter of the microscope.

FIG. 6(*a*) shows for example a spatial filter 200 with a slit 201 parallel to the axis x. The light emitted by the sample strip illuminated by the excitation beam after descanning is also schematically depicted and indicated with reference number 101. In an alignment condition, as depicted in FIG. 6(*a*) the descanned light 101 emitted by the illuminated sample strip is superimposed with the slit 201 of the spatial filter 200.

Misalignment between excitation beam and detection slit can be substantially of two types.

Specifically, a first type of misalignment consists in a shift (also termed herein below "offset") of the descanned light 101 emitted by the illuminated sample strip relative to the detection slit 201 along the axis y. This type of misalignment is schematically depicted in FIG. 6(*b*), and may be due for example to an offset in the synchronization of scanning arrangement and descanning arrangement of the light sheet microscope.

A second type of misalignment may consist in the descanned light 101 emitted by the illuminated sample strip being inclined relative to the detection slit 201 in the plane defined by the axis x and y. This type of misalignment (also termed herein below "inclination") is schematically depicted in FIG. 6(*c*).

The more each of the above types of misalignments is minimized, the better the performance of the confocal light sheet microscope in terms of resolution and contrast.

The system 6' according to the second embodiment of the present invention is advantageously capable of adjusting also the alignment of the excitation beam with the detection slit.

More specifically, with reference to FIG. 5, the system 6' according to the second embodiment comprises the same components as the system 6 described above, allowing the system 6' to adjust the alignment of the light sheet microscope 1 in terms of alignment of the light sheet 100 with the focal plane PF of the objective 2 of the microscope 1. Such components are indicated in FIG. 5 by the same reference numerals as in FIG. 2. A detailed description of such components and their operation will not be repeated.

In addition to the above components, the system 6' also comprises a further beam splitter 7' configured to intercept a fraction of the light emitted by the strip of the sample 4 illuminated by the excitation beam scanned over time as described above. The scanning arrangement and detection slit of the light sheet microscope 1 are not depicted in FIG. 5.

The further beam splitter 7' may be placed on the optical axis z of the microscope 1 or, according to the embodiment shown in FIG. 5, it may be placed on the optical axis z' along which the beam splitter 7 deviates the intercepted fraction of the light coming from the objective 2. In this case, the fraction of light intercepted by the further beam splitter 7' is a fraction of that intercepted by the beam splitter 7. More preferably, the further beam splitter 7' is located between the beam splitter 7 and the arrangement of optical elements 8*a*, 8*b*, 9, 10 configured to focus the fraction of the light intercepted by the beam splitter 7 to form the two bidimensional images IM1, IM2 of the sample slice on the photodetector 11.

The further beam splitter 7' is preferably oriented 45° apart from the optical axis z'. The fraction of light deviated by the further beam splitter 7' preferably amounts substantially to about 10% of the total light incident on the further beam splitter 7'. Alternatively to the beam splitter 7', a dichroic mirror may be used. The dichroic mirror may be either a band-pass mirror or a high-pass mirror. In this case, if the light emitted by the sample 4 is a fluorescence light, the dichroic mirror allows to extract the light scattered by the sample 4 at the same wavelength as the excitation beam. This way, advantageously, all the fluorescence light may be used for the alignment of the light sheet 100 with the focal plane PF. The scattered light further typically has a high intensity, so that the mechanism adjusting the alignment of the excitation beam with the detection slit advantageously has a high signal-to-noise ratio.

The system 6' also preferably comprises a further arrangement of optical elements and a further photodetector 16.

The further arrangement of optical elements is configured to apply a descanning to the fraction of light emitted by the illuminated strip of the sample 4 and intercepted by the beam splitter 7', namely to apply thereto a translation equal and opposite to the translation applied to the excitation beam by the scanning arrangement of the microscope 1. The further arrangement of optical elements is also configured to focus such intercepted fraction of light to form a unidimensional image (namely, a line image) on the photodetector 16.

The descanning applied to the fraction of light emitted by the illuminated strip of the sample 4 is preferably synchronized with the scanning applied to the excitation beam to form the light sheet 100. For this purpose, the system 6' is preferably pre-calibrated to set amplitude and phase of the descanning (namely, same amplitude as the scanning, opposite phase), before starting operation of the microscope 1. This way, in a calibrated and aligned situation, as the scanning of the excitation beam proceeds, the line image formed on the photodetector 16 is static, namely its position Y0 on the photodetector 16 along the axis y is substantially constant over time.

The further arrangement of optical elements of the system 6' preferably comprises one or more galvo mirrors. By way of non-limiting example, the further arrangement of optical elements of the system 6' shown in FIG. 5 comprises a galvo mirror 14. The further arrangement of optical elements of the system 6' also preferably comprises a lens 15. The lens 15 is for example a plano-convex or bi-convex lens. It is preferably placed at a distance from the mirror 14 which is less than its focal length $f_{15}$.

The photodetector 16 is placed downstream the lens 15, preferably at a distance equal to the focal length $f_{15}$ of the lens 15. The photodetector 16 preferably comprises a bidimensional matrix of photodiodes, or a bidimensional CCD sensor, or a bidimensional CMOS sensor.

The photodetector 16 preferably converts the line image in digital format and sends it to the data processing unit 13.

The data processing unit 13 then determines the position of the line image on the surface of the photodetector 16. Specifically, the data processing unit 13 preferably determines at least one of:

- the position Y of the line image along the axis y (and, specifically, its position Y relative to the calibrated position Y0), which is indicative of the offset of the excitation beam relative to the detection slit; and
- the inclination angle of the line image, e.g. relative to the axis x, which is indicative of the inclination of the excitation beam relative to the detection slit.

The data processing unit 13 may then generate commands for adjusting the alignment of the excitation beam with the detection slit.

For example, in case of offset, the phase of the scanning arrangement of the light sheet microscope 1 may be suitably corrected to compensate the offset. In case of inclination, instead, the inclination of the excitation beam may be adjusted by acting on a motorized mirror located on the optical path of the excitation beam in a plane which is confocal with that of the light sheet 100.

It shall be noticed that both the system 6 and the system 6' are advantageously capable of correctly evaluating every type of misalignment herein considered (namely, misalignments of the light sheet 100 relative to the focal plane PF and, for the system 6', misalignments of the excitation beam relative to the detection slit). The measurements of the various misalignments are indeed performed on the detection optical path of the microscope 1, thus “seeing” the sample 4 from the same perspective of the photodetector 5 which acquires the images of the sample 4. Hence, differently from other methods such as observing light transmitted through the sample, or observing the sample from other sides, the measurements provided by systems 6 and 6' are advantageously free from any aberrations that may be introduced by the sample 4 itself.

Though the adjustment of the alignment of the excitation beam with the detection slit of the microscope has been described above as an optional feature in addition to that of adjusting the alignment of the light sheet with the focal plane of the microscope’s objective, this is not limiting. An adjustment system could indeed be envisaged, which comprises only the components needed to implement the adjustment of the alignment of the excitation beam with the detection slit o the microscope, and no component for the adjustment of the alignment of the light sheet with the focal plane of the microscope’s objective.

The invention claimed is:

1. A system for adjusting alignment of a light sheet microscope comprising a light source configured to generate a light sheet illuminating a slice of a sample, wherein said system comprises:

a beam splitter configured to intercept a fraction of light emitted by the slice of the sample when illuminated by the light sheet;

an arrangement of optical elements and a photodetector, the arrangement of optical elements being configured to focus the intercepted fraction of the light emitted by the slice of the sample to form two bidimensional images on said photodetector, each bidimensional image being formed by rays coming from a respective portion of an output pupil of an objective of said light sheet microscope; and a data processing unit configured to identify at least two pairs of corresponding areas in the two bidimensional images, for each pair of corresponding areas determine a mutual distance as a mutual rigid lateral displacement between corresponding areas of the pair of corresponding areas, calculate at least one misalignment parameter indicative of a misalignment of the light sheet relative to a focal plane of the objective of said light sheet microscope based on the mutual distance determined for each pair of corresponding areas, and generate at least one alignment adjustment command based on the at least one misalignment parameter.

2. The system according to claim 1, wherein said arrangement of optical elements comprises:

at least one first optical element configured to form an image of the output pupil of the objective of said light sheet microscope; and at least one second optical element located substantially where the image of the output pupil is formed and configured to deflect at least part of light rays coming from the output pupil so that, downstream from the image of the output pupil, first light rays coming from a first portion of the output pupil and second light rays coming from a second portion of the output pupil follow separate optical paths and converge in the respective bidimensional images, the first portion and the second portion of the output pupil being non overlapping.

3. The system according to claim 1, wherein said data processing unit is configured to apply to each pair of corresponding areas an overall merit function providing a measure of the similarity between the corresponding areas of the pair and to determine the mutual distance as a mutual rigid lateral translation between the corresponding areas of the pair which maximizes the value of the overall merit function.

4. The system according to claim 1, wherein said data processing unit is configured to determine a defocus of each area of the illuminated slice of the sample represented by a respective pair of corresponding areas in the two bidimensional images, based on the mutual distance calculated for the respective pair of corresponding areas.

5. The system according to claim 4, wherein the at least one misalignment parameter comprises a defocus parameter indicative of a distance between the light sheet and the focal plane of the objective calculated as an average of the defocus calculated for the at least two pairs of corresponding areas.

6. The system according to claim 5, wherein said data processing unit is configured to identify the at least two pairs of corresponding areas in the two bidimensional images by splitting each one of the two bidimensional images into four quadrants defined by two orthogonal axes and by identifying one pair of corresponding areas in each pair of corresponding quadrants of the two bidimensional images.

7. The system according to claim 6, wherein the at least one misalignment parameter comprises a rotation angle between the light sheet and the focal plane of the objective about one of the two orthogonal axes, the rotation angle being proportional to a difference between:

the defocus calculated for at least one pair of corresponding areas identified in a pair of corresponding quadrants lying on a side of the one of the two orthogonal axes; and the defocus calculated for at least one further pair of corresponding areas identified in a further pair of corresponding quadrants lying on a further side of the one of the two orthogonal axes.

8. The system according to claim 1, said system being further configured to adjust alignment of a light beam with a detection slit of said light sheet microscope, the light sheet being produced by applying to the light beam a translation over time along a direction perpendicular to the light beam, said system further comprising:

an optical element configured to intercept a further fraction of light emitted by a strip of the slice of the sample when illuminated by the light beam; and a further arrangement of optical elements and a further photodetector, the further arrangement of optical elements being configured to apply to the further fraction of light a further translation equal and opposite to the translation applied to the light beam, and to focus the further fraction of light to form a unidimensional image on said further photodetector, wherein said data processing unit is further configured to determine a position of the unidimensional image on said further photodetector, calculate at least one further misalignment parameter indicative of a misalignment of the light beam relative to said detection slit based on the position of the unidimensional image on said further photodetector, and generate at least one further alignment adjustment command based on the at least one further misalignment parameter.

9. A method for adjusting alignment of a light sheet microscope comprising a light source configured to generate a light sheet illuminating a slice of a sample, wherein said method comprises:

a) intercepting a fraction of light emitted by the slice of the sample when illuminated by the light sheet;

b) focusing the intercepted fraction of the light emitted by the slice of the sample to form two bidimensional images on a photodetector, each bidimensional image being formed by rays coming from a respective portion of an output pupil of an objective of said light sheet microscope; and c) identifying at least two pairs of corresponding areas in the two bidimensional images;

d) for each pair of corresponding areas determining a mutual distance as a mutual rigid lateral displacement between corresponding areas of the pair of corresponding areas;

e) calculating at least one misalignment parameter indicative of a misalignment of the light sheet relative to a focal plane of the objective of said light sheet microscope based on the mutual distance determined for each pair of corresponding areas; and f) generating at least one alignment adjustment command based on the at least one misalignment parameter.

10. A system for adjusting alignment of a light beam produced by a light source of a light sheet microscope with a detection slit of said light sheet microscope, a translation over time along a direction perpendicular to the light beam being applied to the light beam to produce a light sheet illuminating a slice of a sample, said system comprising:

an optical element configured to intercept a fraction of light emitted by a strip of the slice of the sample when illuminated by the light beam;

an arrangement of optical elements and a photodetector, the arrangement of optical elements being configured to apply to the fraction of light a further translation equal and opposite to the translation applied to the light beam, and to focus the fraction of light to form a unidimensional image on said photodetector; and a data processing unit configured to determine a position of the unidimensional image on said photodetector, calculate at least one misalignment parameter indicative of a misalignment of the light beam relative to said detection slit based on the position of the unidimensional image on said photodetector, and generate at least one alignment adjustment command based on said at least one misalignment parameter.

* * * * *